SOLAR PANEL

Filed Dec. 3, 1969 2 Sheets-Sheet 1

INVENTORS
Clyde E. Williamson
Donald R. Baker

BY [signature]

ATTORNEY

SOLAR PANEL

Filed Dec. 3, 1969

INVENTORS
Clyde E. Williamson
BY Donald R. Baker
Harry J. Jacobs
ATTORNEY 3,698,958
SOLAR PANEL
Clyde E. Williamson, Los Angeles, and Donald R. Baker, Lawndale, Calif., assignors to TRW Inc., Redondo Beach, Calif.
Original application Feb. 5, 1968, Ser. No. 703,157. Divided and this application Dec. 3, 1969, Ser. No. 881,699
Int. Cl. H01l 15/02
U.S. Cl. 136—89 1 Claim

ABSTRACT OF THE DISCLOSURE

A solar panel assembly composed of a number of thin film solar cells placed edge-to-edge. The solar cells are fastened along their adjacent edges by strips of tape.

CROSS-REFERENCES TO RELATED APPLICATIONS

This is a division of application Ser. No. 703,157, filed Feb. 5, 1968, now U.S. Patent 3,532,299.

BACKGROUND OF THE INVENTION

(1) Field of the invention

This invention relates generally to solar panels and more particularly to a novel foldable solar panel assembly.

(2) Prior art

Spacecraft are commonly provided with one or more solar cell arrays for supplying electriacl power to electrical equipment onboard the spacecraft. Such an array consists of a member of individual solar cells mounted on a suitable support and electrically connected in such a way as to provide the desired electrical output. The electrical power generated by such a solar array, of course, is related to the number of solar cells in the array. Solar arrays may be generally classified as fixed arrays and deployable arrays. A fixed array is one in which the solar cells are mounted on fixed panels, or the like, rigidly secured to the spacecraft body. Exemplary of such a fixed array, for example, is that employed on the COMSAT satellite, wherein the solar panels are mounted circumferentially about the satellite body. A deployable array, as its name implies, is one which is retained in a retracted or collapsed position or stowage during launch and is then deployed to an extended position of operation when in orbit. The primary advantage of the deployable array over the fixed array is the larger effective area, and hence a greater number of solar cells and greater electrical output, of the deployable array.

Deployable solar arrays, while superior from the standpoint of electrical output, present certain problems which the present invention seeks to overcome. Among the foremost of these problems is stowage of the array during launch and extension of the array when in orbit without excessive weight penalty, cost factors, and operational reliability. A variety of deployable solar arrays have been devised which seek to solve, in different ways, the above and other problems which attend such arrays. Some existing solar arrays of this type, for example, embody a drum on which the array is stowed during launch and from which the array is deployed when in orbit by driving the drum in a direction to unwind the array from the drum. Another existing deployable solar array utilizes a frame, tennis racket-like substrate on which the solar cells are mounted. This array is folded for launch and deployed by unfolding the substrate. These and other existing deployable arrays, however, are characterized by various deficiencies, notably excessive complexity and weight.

SUMMARY OF THE INVENTION

The present invention provides a foldable solar panel assembly composed of a number of generally planar and rectangular solar panels hinged edge-to-edge. According to a preferred and highly beneficial feature of the invention these solar panels each comprise a number of so-called thin-film solar cells joined edge-to-edge by strips of adhesive tape or other suitable means to provide a solar panel assembly characterized by large effective area, light weight, flexibility, and minimum stowage volume. In the stowed position, the solar panels of the assembly are disposed in face-to-face relation to provide a relative flat folded array of minimum stowage volume.

DESCRIPTION OF THE PREFERRED EMBODIMENTS

Figure 1:
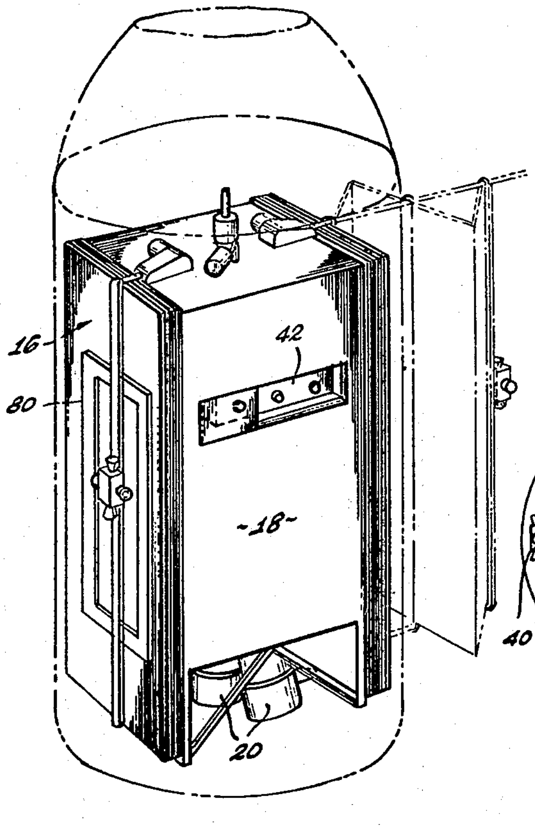
FIG. 1 is a perspective view of a spacecraft embodying a pair of the present deployable solar arrays.

The present invention provides a deployable solar cell array, represented in FIGS. 1 through 6 by the array 10, having a foldable solar panel assembly 12 and deployment means 14 for the assembly. The illustrated solar array is mounted on a spacecraft 16. Since the precise construction of the spacecraft forms no part of the invention, it is unnecessary to describe the same in detail. Suffice it to say that the spacecraft has a housing 18 which forms part of the craft body. This housing is generally rectangular or cylindrical in shape and contains various equipment including, in this instance, a number of ion thrust engines 20 to be powered by the electrical output from the solar cell array 10.

Referring now to array 10 in general terms, its solar panel assembly 12 is composed of a number of generally planar and rectangular solar panels 22 disposed edge-to-edge, and hinge means 24 pivotally joining the adjacent panels along their longitudinal edges 26. Solar array 10 is located at one side 28 of the spacecraft housing 18 and has an inner end panel adjacent the housing and an opposite outer end panel remote from the housing. These inner and outer end panels have free longitudinal edges 30 and 32, respectively. The free edge 30 of the inner panel is pivotally joined, by an inner hinge means 34, to the housing side 18. The several hinge axes parallel the longitudinal axis 36 of the housing 18. It will become evident as the description proceeds, however, that the present solar array 10 may be oriented in some other attitude relative to the housing.

Figure 2:
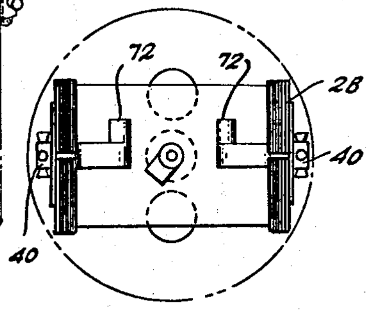
FIG. 2 is a top plan view of the spacecraft.

During launch, the solar panel assembly 12 is folded in accordion fashion to a retracted position of stowage, shown in FIGS. 1 and 2. In this retracted position, the folded assembly is positioned flat against the side 28 of the spacecraft housing 18 with the solar panels 22 disposed in face-to-face relation. This provides the folded aassembly with minimum stowage volume. At some time after launch, such as when the spacecraft has achieved final orbit, the solar panel assembly 12 is unfolded or deployed to an extended position of operation illustrated in FIGS. 3 and 4. In this extended position, the solar assembly projects in wing-like fashion laterally from the spacecraft housing 18 with the solar panels 22 disposed in generally coplanar edge-to-edge relation so as to provide a solar cell array of relatively large effective area.

The solar panel deployment means 14 is mounted on the spacecraft housing 18 and is connected to the solar panel assembly 12 for deploying the latter from its retracted position of stowage to its extended position of operation. As noted earlier, a variety of deployment means may be utilized to thus deploy the panel assembly. The particular deployment means illustrated comprise a longitudinally extendable boom mechanism mounted on the housing 18 for longitudinal extension along a direction line normal to the hinge axes of the solar panel assembly 12. During launch, the boom mechanism 14 is retracted to its position of FIGS. 1 and 2 to retain the panel assembly in its stowed position. During deployment, the boom mechanism is extended to its position of FIGS. 3 and 4. In the course of this extension, the boom mechanism pulls the solar panel assembly longitudinally outward from the spacecraft housing 18 and thereby unfolds and deploys the assembly.

The particular spacecraft 16 illustrated is equipped with a pair of the deployable solar arrays 10. These arrays are mounted at opposite sides of the spacecraft housing 18 and are deployed in unison to their extended operating positions of FIGS. 3 and 4. Mounted on the outer ends of the two solar arrays are attitude control ion engines 40. These engines, and the ion thrust engines 20, are electrically connected, through suitable control equipment 42 within the housing 18, to the solar panels 22 in such a way that the engines are powered by the electrical output from the panels. It will be observed that when the two solar arrays 10 are deployed or extended, their solar panel assemblies 12 are disposed in planes parallel to the longitudinal axis 36 of the spacecraft housing 18. In the particular embodiment of the invention under consideration, the two panel assemblies, when deployed, are located in a common plane containing the housing axis. This coplanar relationship of the deployed arrays, however, is not essential, as will become evident from the later description.

Figure 1A:
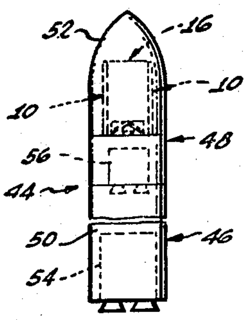
FIG. 1*a* is a side elevation in reduced scale of a launch vehicle for launching the spacecraft into orbit.

Insofar as the present invention is concerned, the method of launching the spacecraft 16 into orbit, and the overall configuration of the launch vehicle used for this purpose are of no consequence. For this reason, it is unnecessary to describe the launching technique and vehicle in detail. However, one possible launch vehicle configuration has been illustrated in FIG. 1*a* merely to provide a better understanding of the invention and its advantages. The illustrated launch vehicle 44 will be seen to comprise a main booster stage 46 and a secondary booster stage 48. These stages have cylindrical shrouds 50, 52 and booster engines 54, 56, respectively. The spacecraft 16 is mounted within the secondary stage shroud 52. In this regard, it is significant to note that an important advantage of the invention resides in the fact that the present solar arrays 10, when in their retracted positions of stowage, are so compactly folded as to permit the spacecraft housing 18 and the folded arrays to be completely contained within and enclosed by the secondary stage shroud 52. With this particular launch vehicle configuration, the spacecraft 16 is placed into orbit by first igniting the main booster engines 54 to propel the launch vehicle to the altitude at which second stage separation and ignition is to occur. At this altitude, the booster stages 46, 48 are disconnected and the secondary stage engines 56 are ignited to accelerate the secondary stage to the desired orbital velocity and trajectory of the spacecraft. The shroud 52 of the secondary is then ejected to uncover the spacecraft and the latter is separated from the secondary stage. After the spacecraft has thus been injected into orbit, the solar arrays 10 are deployed to their extended positions of operation and the spacecraft engines 20, 40 are activated to maneuver the spacecraft into the proper orbital attitude in which the deployed solar arrays face the sun.

Figure 3:
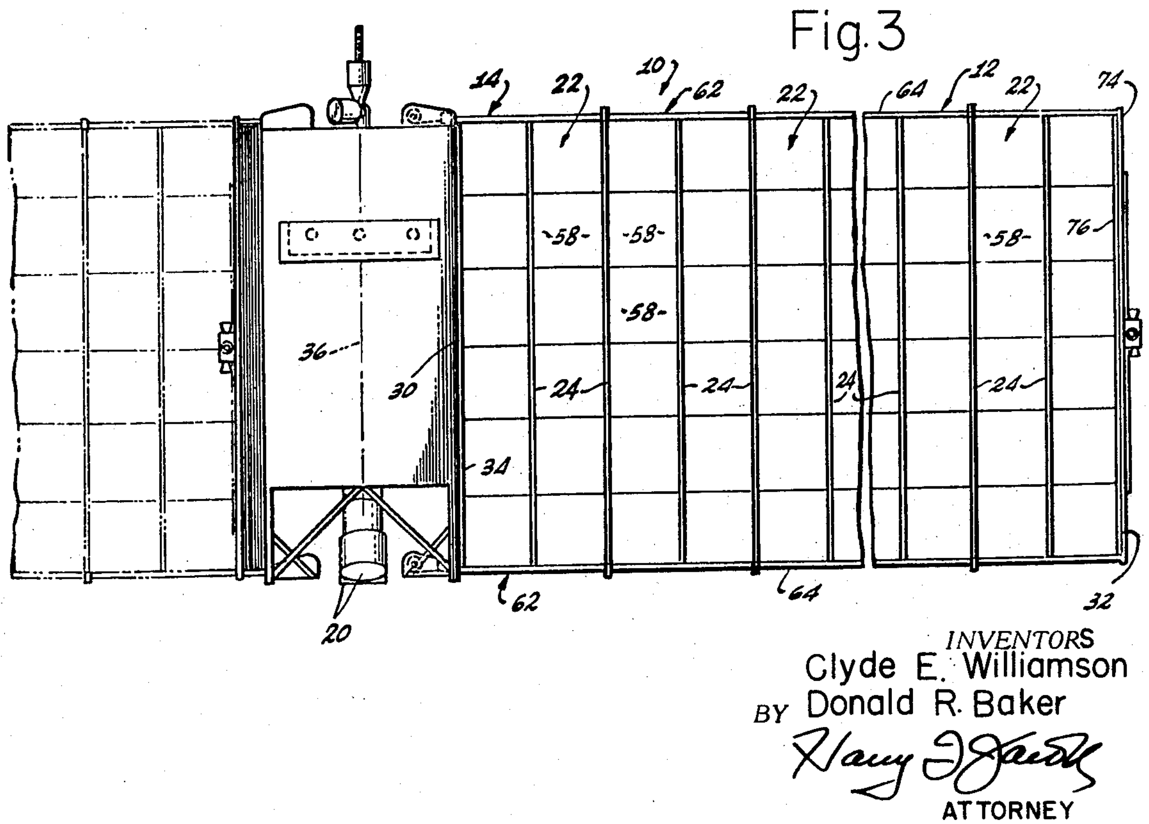
FIG. 3 is a side elevation of the spacecraft showing one of the solar arrays in a retracted position of stowage which it occupies during launch and the other solar array deployed to its extended position of operation.
Figure 4:
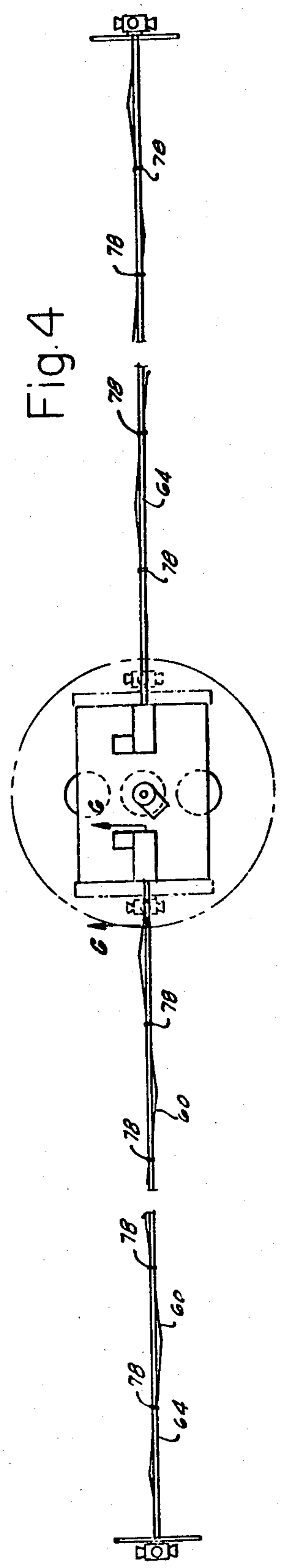
FIG. 4 is a top plan view of the spacecraft with both solar arrays deployed to their extended positions of operation.

Referring now in greater detail to the drawings, each solar panel 22 of the solar panel assembly 12 comprises a number of individual solar cells 58 arranged edge-to-edge in a rectangular pattern so as to provide the panel with an overall rectangular shape. According to the preferred practice of the invention, so-called thin-film solar cells are employed in the panel assembly. Since these cells are commercially available and their details of construction are not directly pertinent to the invention, they need not be described in detail. Suffice it to say that typical cells of this type have a thin, flexible substrate 60 which is generally square in shape and measures on the order of 3" x 3". According to the present invention, the solar cells on each solar panel 22 are joined edge-to-edge by strips 61 of tape or other suitable means. The solar panel hinges 24, 30 may comprise piano hinges, Mylar flexural hinges, or the like. Turning now to FIG. 3, it will be observed that the deployment boom mechanism 14 of each solar array 10 embodies a pair of separate boom devices 62 having longitudinally extendable booms 64 which straddle the corresponding solar panel assembly 12 in the endwise direction of its hinged solar panels 22. The outer ends of the booms are hinged to the outer panel 22 of the panel assembly and the remaining panels are slidably and rotatably supported on the booms, all in a manner to be explained presently, whereby extension of the booms in unison deploys the panel assembly to its extended position of operation shown in FIG. 3. Obviously, a variety of extendable boom devices may be employed for this purpose, such as telescoping booms, for example. The particular boom devices illustrated, however, are preferred because of their relatively low-weight and simplicity of construction.

The illustrated boom devices 62 are commercially available. Accordingly, it is necessary to describe these devices only in such detail as to provide a complete understanding of the present invention. With this in mind, it is sufficient to say that the boom 64 of each device is a strip of spring metal, typically a stainless steel strip, which is stressed to normally curl laterally into a generally cylindrical tube-like configuration having its central axis parallel to the longitudinal axis of the strip. The inner end of the boom strip is secured to a drum 66 which is rotatably supported within a housing 68 mounted on the spacecraft housing 18. The outer end of the boom extends from the housing through a cylindrical exit guide 70. In the normally retracted condition of each boom 64, its strip is wound in a flat condition on the drum 66 to position wherein the outer end of the boom is located adjacent the corresponding side 28 of the spacecraft housing 18. The boom is extended by driving the drum 66 in a direction to unwind the strip from the drum. As the boom strip is thus unwound from the drum, it curls laterally into its cylindrical tube-like configuration and emerges longitudinally through the boom housing exit guide 70 in the form of a tubular boom. Drum 66 is driven by a motor 72 which is reversible to permit both extension and retraction of the boom strip. In the ensuing description, the boom strip will be referred to simply as a boom.

In the particular embodiment of the invention under consideration, the length of the solar panels 22 in the direction of their hinge axes approximates the overall length of the spacecraft housing 18. The two boom devices 62 of each solar array 10 are mounted on opposite ends of the housing in such a way that the longitudinal axes of their exit guides 70 are located in the common plane of their inner solar panel hinges 34 and extend normal to the adjacent side face 28 of the housing. Thus, the booms 64 are extendable along parallel direction lines in the planes. Extending between and secured to the outer ends of the two booms of each solar array 10 is a tie-bar 74 which mounts the corresponding spacecraft attitude control engine 40. An outer hinge 76 pivotally joins this tie-bar to the free edge 32 of the outer end panel 22 of the panel assembly 12. The axis of the outer hinge parallels the other hinge axes of the panel assembly. The assembly panels 22 are joined to the booms 64 by slide pivot connection 78. These connections are slidable along the booms and are secured to the panels in such a way as to permit pivoting of the panels relative to the booms about axes parallel to the panel assembly hinge axes. In the particular embodiment of the invention under discussion, the slide pivot connections 78 are aligned with alternate hinges 24 of the panel assembly 12. Various types of slide pivot connections may be employed in the present solar array. The particular connections illustrated comprise rings.

Prior to launch of the spacecraft 16, the deployment booms 64 of the two solar arrays 10 are retracted to the stowed position of FIGS. 1 and 2 to fold the solar panel assemblies 12 to their stowed positions. In this regard, it will be observed that the panel assemblies are folded in such a way that the two innermost solar panels 22 fold to one side of the common plane of the booms, the next two panels fold to the opposite side of this plane, the following two panels fold to the first side of the plane, and so on in alternate fashion. In the fully retracted or stowed positions of the solar arrays, the outer ends of the booms 64 are located adjacent the sides 28 of the spacecraft housing 18, and the solar panel assemblies 12 are folded flat against the housing sides with their solar panels 22 disposed in face-to-face relation at opposite sides of the boom plane. Means 80 are preferably provided for retaining the panel assemblies in these folded positions. Such panel retaining means may comprise lightweight strong backs or frames secured to the outer boom tie-bars 74 so as to press against the outer panels 22 of the folded panel assemblies when the booms are retracted. It should be noted here that a significant advantage of the illustrated solar arrays resides in the fact that the solar panels 22, being composed of thin-film solar cells, are relatively flexible and thus may conform to any reasonable curvature of the spacecraft housing sides 28. Accordingly, while the illustrated spacecraft housing is shown to have flat sides, these sides could be curved. In the event that the housing sides are thus curved, the strong-back frames 80 will be correspondingly curved so as to retain the folded solar panel assemblies 12 flat against the curved sides. As noted above, panel retaining means other than the illustrated strong-back frames may be employed for retaining the solar panel assemblies 12 in their folded positions. For example, the folded panel assemblies may be releasably pinned to the spacecraft housing. Alternatively, the outer end panels of the assemblies may be made relatively stiff so as to serve as strong-backs. A wide variety of other panel retaining means may be employed, of course.

After the solar arrays 10 have been properly stowed, the spacecraft 16 is mated with its launch vehicle 44. In this regard, it will be recalled that when the spacecraft is assembled in the launch vehicle, the craft, and its folded solar arrays, is enclosed by the secondary stage shroud 52 of the vehicle. After launching of the spacecraft into orbit, in the manner explained earlier, the solar arrays 10 are deployed to their extended positions of operation illustrated in FIGS. 3 and 4 by extension of the solar panel deployment booms 64. It will be understood, of course, that during this extension of the booms, the solar panel assemblies 12 are pulled outwardly by virtue of the outer hinge connections 76 between the outer end panels 22 of the assemblies and the boom tie-bars 74. As the panel assemblies are thus deployed, their solar panels progressively unfold until, in their fully deployed positions, the panels are disposed in generally edge-to-edge relation substantially in the common plane of the extended deployment booms 64. The slide pivot connections 78 permit the solar panels 22 to pivot and slide relative to the booms during their deployment, thus to enable unfolding of the solar panel assemblies.

As noted earlier, the electrical output generated by the solar arrays 10 may be utilized to power various electrical equipment on board the spacecraft 16. In the illustrated spacecraft, the electrical output of the solar arrays is used to energize the thrust and attitude control ion engines 20, 40. With the particular mounting of the solar arrays illustrated in FIGS. 1 through 6, the attitude control engines 40 may be mounted directly on the deployment boom tie-bars 72, as shown, since the deployed solar arrays 10 are located in a common plane containing the longitudinal axis 36 of the spacecraft housing 18.

Figure 7:
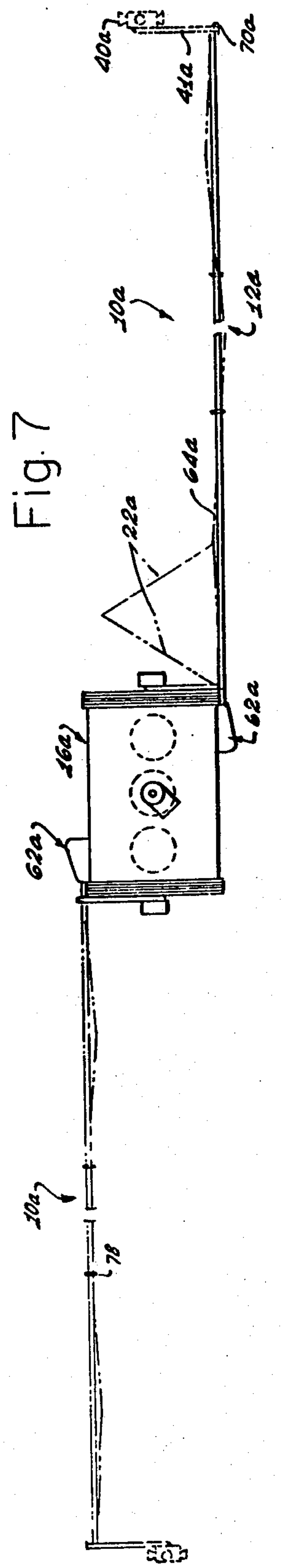
FIG. 7 is a top plan view of a spacecraft embodying slightly modified solar arrays according to the invention.
Figure 6:
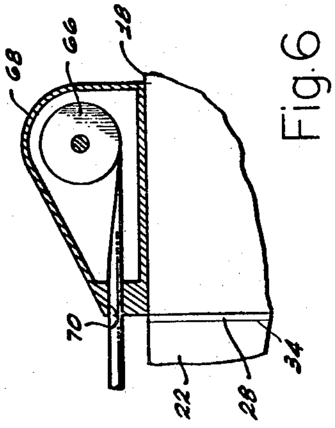
FIG. 6 is an enlarged section taken on line 6—6 in FIG. 4.
Figure 5:
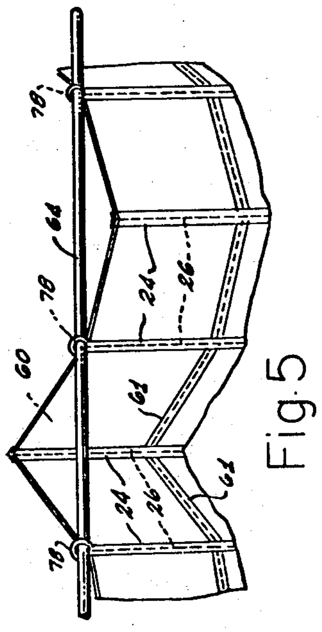
FIG. 5 is a fragmentary detail in perspective of one of the solar arrays.

Reference is now made to FIG. 7 which illustrates slightly modified solar arrays 10*a* according to the invention mounted on a spacecraft 16*a*. The modified solar arrays are identical to the solar arrays 10 except that the modified arrays are mounted on the spacecraft housing 18*a* at opposite sides of a common longitudinal medial plane of the spacecraft containing its longitudinal axis. The array deployment boom devices 62*a* are mounted on opposite sides of the housing in such a way that their booms 64*a* extend along direction lines parallel to and located at opposite sides of the medial plane. Moreover, the solar panel assembly 12*a* of each solar array 10*a* is folded to its stowed position in a way that all of its solar panels 22*a* fold into face-to-face relation at the same side of the respective deployment booms 64*a*, as shown in FIG. 5. The modified solar arrays 10*a* are otherwise identical to and are deployed in precisely the same way as the first described solar arrays 10 of the invention. Accordingly, no further description of the modified solar arrays is deemed necessary.

The embodiment of the invention illustrated in FIG. 7 also utilizes a slightly modified mounting arrangement for the attitude control engines 40*a* of the spacecraft 12*a*. In this regard, it will be observed that these engines are mounted on brackets 41*a* which are attached to the outer boom tie-bars 74*a*. These brackets extend laterally toward the medial plane of the spacecraft 16*a* to locate the attitude control engines in this plane.

While the invention has been disclosed in connection with certain illustrative embodiments thereof, it will be immediately recognized by those versed in the art that various modifications of the invention are possible.

What is claimed is:

1. A lightweight folding solar panel assembly comprising:

an array of rectangular thin-film solar cells arranged edge-to-edge in rows extending longitudinally and laterally of said panel;

said array having uniformly spaced fold lines extending along the adjacent edges of adjacent lateral cell rows and defining solar panels between the adjacent fold lines;

sheet thin flexible foldable strips extending along said fold lines and joined to the adjacent cell edges to form hinges for folding of the panel assembly accordian fashion on said fold lines to a stowage configuration wherein said panels are disposed in confronting face-to-face relation; and tape strips extending along and joined to the remaining cell edges to join the adjacent cells.

References Cited

UNITED STATES PATENTS

| | | | |
|---|---|---|---|
| 2,096,559 | 10/1937 | Riley | 16—150 |
| 2,829,081 | 4/1958 | Sweem | 16—150 UX |
| 3,094,439 | 6/1963 | Mann et al. | 136—89 |
| 3,369,939 | 2/1968 | Myer | 136—89 |
| 3,375,141 | 3/1968 | Julius | 136—89 |
| 3,459,391 | 8/1969 | Haynos | 136—89 X |
| 3,477,662 | 11/1969 | Anderson | 136—89 X |

ALLEN B. CURTIS, Primary Examiner